United States Patent [19]

Lehrer

[11] 3,830,686

[45] Aug. 20, 1974

[54] PHOTOMASKS AND METHOD OF FABRICATION THEREOF

[76] Inventor: William I. Lehrer, 1161 Seena Ave., Los Altos, Calif. 94022

[22] Filed: Apr. 10, 1972

[21] Appl. No.: 242,383

[52] U.S. Cl. .................... 95/1 R, 96/38.3, 156/3, 355/125, 117/124 C

[51] Int. Cl. .................... C03c 17/00

[58] Field of Search .................... 95/1 R; 96/38.3, 67; 355/125, 133; 117/124 C; 156/3

[56] References Cited

UNITED STATES PATENTS

| | | | |
|---|---|---|---|
| 3,271,488 | 9/1966 | Dahlberg | 156/3 X |
| 3,511,683 | 5/1970 | Espenscheid et al. | 117/124 C |
| 3,561,963 | 2/1971 | Kiba | 96/38.3 UX |
| 3,649,393 | 3/1972 | Hatzakis | 156/3 |

*Primary Examiner*—Robert P. Greiner

[57] ABSTRACT

Photomasks and method of fabrication thereof, whereby a thin layer of germanium is deposited to a substrate which may be then etched in a pattern to provide a photomask or information storage device. In the fabrication method, a substrate is carried by belt through a first inert gas curtain into a furnace containing a mixture of suitable gases for causing the deposition of germanium onto the heated substrate, and there outward through a second inert gas curtain into a cooling region. The use of a germanium film for a mask blank results in a mask which is reasonably transparent to visible light but substantially opaque to ultravoilet light, and which may be deposited on to and removed from various substrates including glass using etchants which do not attack the substrate material.

6 Claims, 6 Drawing Figures

PHOTOMASKS AND METHOD OF FABRICATION THEREOF

BACKGROUND OF THE INVENTION

1. Field of the Invention

Figures 1, 2A, 2B, 2C, 2D, 2E:
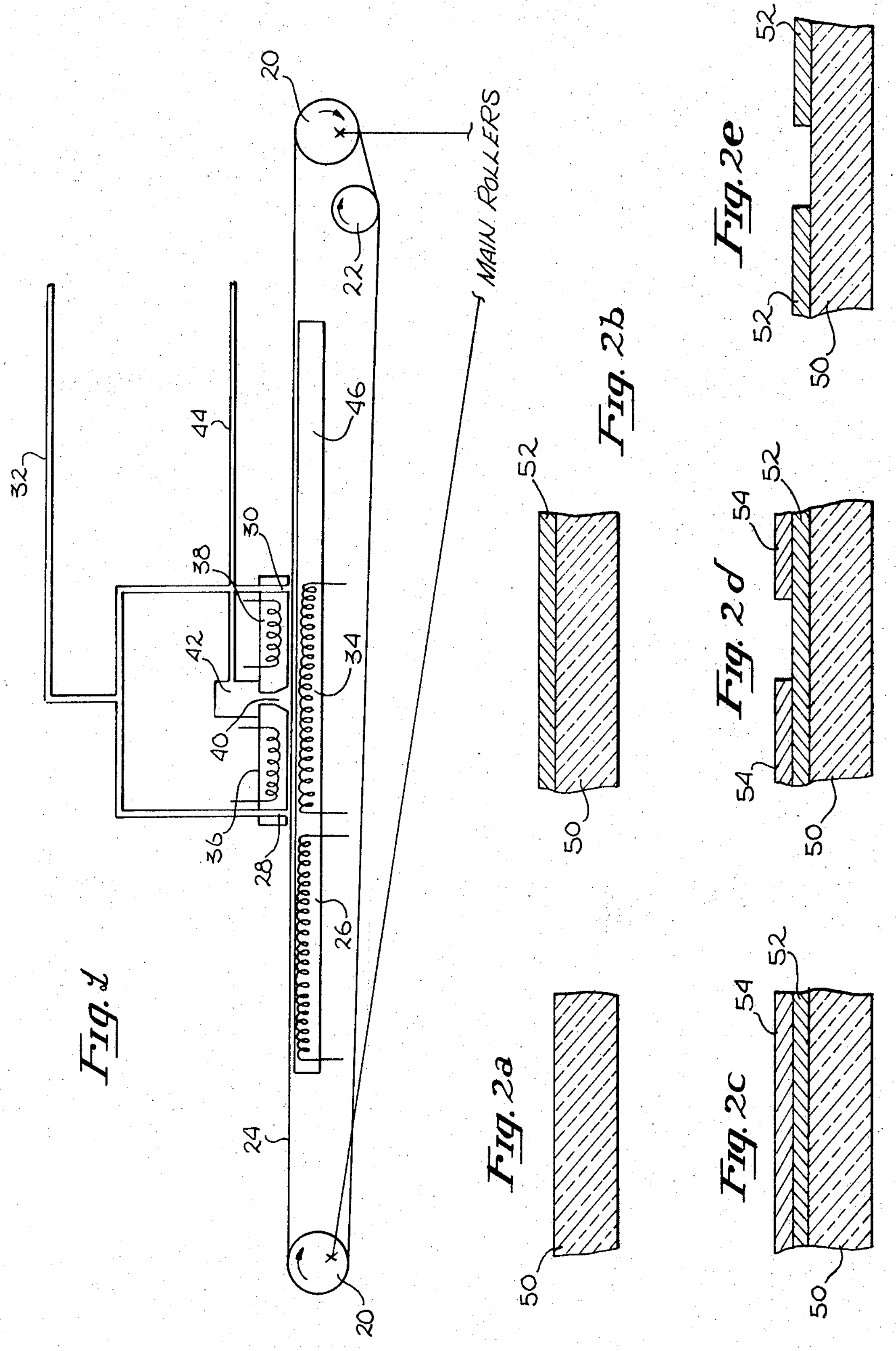

This invention relates to the field of photomasks and information storage devices.

2. Prior Art

In the prior art, negatives (e.g., masks) used for high performance applications (e.g., high resolutions) such as semiconductor manufacture have been primarily emulsion masks or chrome masks. The emulsion masks consist of a photogaraphic gelatin coating containing silver halide particles on one side of a glass plate. Transparent and opaque areas are formed by the conversion of the silver halide to metallic silver. These developed emulsions are relatively soft, and because of this are subject to rapid wear and deterioration in use.

As an alternative, chromium masks are now being made, wherein chromium is evaporated onto a glass substrate and then a photoresist is put over the chromium. Subsequent exposure and development of the photoresist exposes areas of the chromium which can be etched away by a suitable etchant. After etching and removing the photoresist, a chromium image is left on the glass plate. The chromium is considerably harder than a photographic emulsion and, therefore, is subject to wear and deterioration at a much slower rate than the emulsion masks. However, the process for making such masks is much more involved than the simple photographic process for making the emulsion masks, thereby resulting in a much higher cost for chromium masks than for emulsion masks.

Recently a number of other materials have been suggested for use as masking blanks. One such material is silicon. This material has provided significant improvements over chrome but it has the shortcoming of being difficult to etch when on a glass substrate, difficult to deposit evenly, and requiring deposition at a relatively high temperature. The high temperature deposition has an adverse effect on certain glasses (i.e. sodalime) and requires relatively high priced glasses (i.e. borosilicate) in order to maintain original surface characteristics at the required temperatures. The silicon also forms an oxide layer on its surface which prevents multiple coating in order to reduce imperfections and makes adhesion of resist a problem. Therefore, at the present time, the primary choice is between a relatively inexpensive mask which has a short useful life and a relatively expensive mask (chrome) which has a longer useful life.

The opaque areas of both chrome and emulsion masks are opaque to visible light as well as ultraviolet light. Consequently, when the mask is in place over a semiconductor wafer, the areas of the wafer beneath the opaque portion of the mask are not visible to the naked eye. In addition, the chrome masks have the undesirable characteristic of being highly reflective. Such reflective qualities tend to degrade the edge definition that may be reproduced by chrome masks by causing secondary images.

Another art employing substrate coated with opaque materials involves their use as a means of storing information. The closest equivalents for the permanent storage of information are such things as punched cards and preprogrammed diode matrices; neither of which is sufficiently similar to the present invention to draw extensive comparisons.

BRIEF SUMMARY OF THE INVENTION

Photomasks and method of fabrication thereof, whereby a thin layer of germanium is deposited to a substrate which may be then etched in a pattern to provide a photomask or information storage device. A substrate, typically a transparent substrate such as soda-lime glass plates is carried by a belt through a first inert gas curtain (nitrogen) into a furnace containing a mixture of germane and hydrogen for causing the deposition of germanium onto the heated substrate. The furnace temperature may range typically from 400° to 475°C but can be higher for refractory substrates with the germane-hydrogen proportion, belt speed, and other perimeters being adjusted to achieve the deposition thicknesses desired. The heated substrate moves continuously through the furnace and outward to a second inert gas curtain into a cooling region. The use of a germanium film for a mask material results in a mask which is reasonably transparent to visible light but substantially opaque to ultraviolet light, and which may be deposited to and removed from said substrate using etchants which do not significantly effect the substrate material. The method and apparatus for continuous deposition of germanium is disclosed, as well as the unique photomask resulting from the method and apparatus.

BRIEF DISCRIPTION OF THE DRAWINGS

FIG. 1 is a schematic diagram of the deposition apparatus of the present invention.

FIGS. 2*a* through 2*e* are cross sectional views of a substrate showing various steps in the fabrication of the photomask of the present invention.

DETAILED DISCRIPTION OF THE INVENTION

First referring to FIG. 1, a schematic diagram of the apparatus used for the deposition of the germanium film of the present invention may be seen. This figure shows a continuous flow furnace through which substrates pass, and within which a thin layer of germanium is deposited thereto. Thus, a pair of main rollers 20 are disposed at each end of the apparatus with a third roller 22 disposed so as to apply tension to the belt 24 passing over the rollers. The belt 24 generally should be capable of enduring temperatures up to 600°C without deterioration, such as by way of example, a woven metal or a solid metal shim stock material ranging from one to five thousandths of an inch thick, depending upon the substrate to be coated. In the preferred embodiment, shim stock of 1.0 to 3.0 thousandths kovar has been used.

The rollers are driven in rotation in the direction indicated by the arrows, by conventional electrical drive means. Preferably, such drive means should be variable in speed so as to allow the selection of belt speed in the range of two to twenty inches per second. As will subsequently become apparent, the thickness of the deposited layer is strongly dependent upon the belt speed, and such range of selectability of belt speed allows the wide range in deposition thicknesses for germanium, as well as the use of the equipment for the deposition of other materials by the prototype decomposition of the appropriate selected gaseous compounds.

As the belt proceeds in the direction indicated with the substrate to be coated located thereon, the belt passes over a preheater block 26 which, for the deposition of germanium, is adjusted to preheat the substrate to a temperature in the range of 250° to 300°C. (In the preferred embodiment, electric heaters are used). After passing the preheater block region, the substrates pass under an inert gas curtain and into the deposition zone. The inert gas curtain is comprised of slots 28 and 30 at the belt entrance and exit respectively, of the deposition region. The slots 28 and 30 are in communication with an inert gas supply line 32 which, through a valve adjustment means (not shown) may be adjusted to provide a pressure and flow in slots 28 and 30 so as to insure the outward flow of gas along the belt surface and prevent contaminents and undesired gaseous compounds from traveling inward into the deposition region.

Within the deposition region is a heater, generally located in the lower heater block in the region indicated by numeral 34, and a pair of heaters in upper heater blocks 36 and 38. Between the two upper heater blocks is a generally enlongated opening 40 in communication with a manifold 42 connected to line 44, through which a proper gas in accordance with the material to be deposited by the furnace is injected. Any conventional pressure regulator/throttle arrangement may be used (not shown) to meter the deposition gas through line 44, so as to achieve the desired flow rate of the gas through the manifold 42 and outward through slot 40 so as to flow both forward and rearward between the upper and lower heater blocks towards the slots 28 and 30 providing the inert gas curtain. Thus, it may be seen that in the region generally located between slot 28 and slot 30, the substrate to be coated is exposed to a temperature determined by the heater blocks 34, 36, and 38, and the top surface thereof is subjected to a relatively uniform flow of deposition gas thereover so as to cause the deposit of the desired film or layer of material in accordance with the temperature of the heater blocks, the deposition gas composition and purity, and the speed of the belt 24.

As the substrate moves outward beyond slot 30 providing the exit inert gas curtain, the substrate is slowly cooled as a result of the passage over the extension 46 of the heater block, which does not contain the heater, and cools to a temperature so that it may be readily handled before reaching roller 20, thereby facilitating removal from the belt before the belt passes over the roller.

The present invention is particularly suited for the deposition of germanium to substrates to provide such articles as photomask blanks. In the production of semiconductor devices a number of masks are used, each of which typically contains a matrix of identical small patterns defining various portions of the circuit to be fabricated. These masks are used in a contact or projection printing process to expose a photoresist applied to the semiconductor wafer, which is subsequently developed to define a photoresist pattern, allowing etching of the substrate in the desired pattern. Since photoresists commonly used in such fabrication techniques are sensitive primarily to ultraviolet light, the photoresist is exposed through the photomasks from an ultraviolet light source. Consequently, the opaque areas of the photomasks need be substantially opaque only to ultraviolet light. In this regard, for purposes of alignment and ease in observation of the substrate during the fabrication process, it is desireable for the "opaque" areas to be transparent or at least somewhat transparent to visible light. Thus, in accordance with the present invention, transparent substrates such as glass substrates may be coated within a thin layer of germanium using, by way of example, the deposition apparatus of the present invention, to provide photomask blanks, also a part of the present invention, which may be subsequently readily etched in a pattern to provide a photomask of high quality and durability for use in such fabrication.

To provide the photomask blank of the present invention using the deposition equipment of the present invention, a glass substrate is first provided of the desired size which has been carefully cleaned and dried to provide a dry, contaminant free surface for deposition. The heaters in the heater block region 26 are adjusted to preheat the substrate to a temperature of approximately 250° to 300°C, and the heaters in the heater blocks 34, 36, and 38 are adjusted to heat the substrate in the deposition region to approximately 400° to 475°C. The deposition gas to deposit germanium typically may be a mixture of germane ($GeH_4$) and hydrogen in the porportions of approximately five to ten parts hydrogen to one part germane. For the deposition of a suitable germanium film to a 2½ by 2½½ inch glass substrate the deposition gas composition and flow rate may be established by providing a germane flow rate of 5 to 10 milliliter per minute and a hydrogen flow rate of approximately 55 milliliters per minute. The blet speed when using a deposition chamber length of approximately 12 inches, may range from 4 to 20 inches per minute, which will provide a range of thicknesses in the deposited germanium from 2,500 angstroms to somewhat less than 200 angstrom. It has been found that photomask blanks and resulting photomasks having a germanium film thickness ranging from 500° to 1,500° provide the best results, at least for exposure of photoresists commonly used in the fabrication of semiconductor devices. (The gas curtain in the preferred embodiment is nitrogen, though other gases may also be used).

To fabricate the photomask from the photomask blank comprised of the transparent substrate with a coating of germanium thereon, a layer of photoresist is applied to the top surface of the germanium, and is exposed through a mask such as a conventional emulsion mask fabricated by the photo reduction of the desired art work. The photoresist is then developed, and the exposed areas (or unexposed areas depending upon whether a positive or negative photoresist is used) are dissolved away, thereby leaving a pattern of photoresist in the desired configuration. The next step is to etch the exposed areas of germanium by a suitable etchant so as to remove the germanium from the areas which are to be transparent to the ultraviolet light. Finally, the remaining photoresist is dissolved away, thereby leaving the finished photomask.

The photomask of the present invention has many advantages over the masks known in the prior art. In comparision to the emulsion masks, the germanium film thickness required for satisfactory performance is much thinner than typical emulsion films. Thus, the germanium mask will allow the production of images of greater sharpness and accuracy because of a reduction in the edge effect of the mask pattern and the effects of an imperfectly collimated light source. Furthermore, the germanium is a hard, scratch resistant and tenacious coating for glass substrates, and is not easily damaged or removed from the substrate by normal abrasion during usage occurring because of the contact printing process. Therefore, germanium masks of the present invention may be used many more times than emulsion masks before having to be replaced. Furthermore, germanium as the mask pattern definition material has advantages over other possible materials, such as by way of example, silicon, in that germanium is easily selectively etched without simultaneously etching the glass substrate. Thus, in the preferred embodiment, an etchant comprised of 330 grams ceric ammonium nitrate, 100 milliliters of perchloric acid, diluted with water to make 2,000 milliliters of solution, has been found to be a suitable etchant for such purpose. The selective etching capability has advantages not only for fabricating the mask of the present invention, but also for salvaging the glass plates or substrates used in masks which are defective or otherwise not useful.

Thus referring to FIG. 2*a*, a substrate 50 may be seen. For the fabrication of photomasks, substrate 50 may be a quartz substrate or for high quality masks of lower cost, may be a glass substrate. The substrate 50 is coated with a thin layer of germanium 52, as shown in FIG. 2*b*. For photomask applications wherein the photomasks will be used with an ultraviolet light source the germanium film should have a thickness generally falling within the range of 500 to 1,000 angstroms. Film thicknesses substantially thinner than this range tend to be unnecessarily transparent to ultraviolet light, while films substantially thicker than this range are unnecessarily opaque to visible light, take an unnecessarily long time to etch and yield pattern edge definition of lower quality and accuracy. The germanium film 52 is then coated with a photoresist layer 54, typically sensitive to ultraviolet light. Of course, other resist materials, such as by way of example, an electron resist may be used, and exposed either through an electron beam scanning system or through a field emission system. After the photoresist 54 is developed, the exposed (or unexposed portion, depending upon whether a negative or positive photoresist is used) is dissolved away, exposing a portion of the germanium film 52 thereunder as shown in FIG. 2*d*. Thereafter, the germanium film is etched as heretofore explained. Finally the remainder of photoresist is dissolved away, leaving the patterned germanium film as indicated in FIG. 2*e*. Of course, these figures are for purposes of explanation only, as the intricacy and and accuracy of the germanium patterns readily fabricatable with the photomask blanks of the present invention are impossible to represent in a drawing of this nature. Also, it is to be understood that a photomask is merely an object for the storage of various information which may be utilized through a utilization system, such as an optical system. By way of example, in semiconductor manufacturing processes, contacting printing processes are used and masks of the greatest possible quality are required. In this regard, the pyrolytically deposited germanium is highly effective since it is readily deposited in a continuous process using the apparatus of the present invention to achieve a controlled thickness, pinhole free film. Further, the low deposition temperatures used allow the use of relatively inexpensive materials such as glass for the substrate. However, the same photomasks may be used in projection systems and similarly, may be used to store other types of information such as written or coded information for later retrieval through an appropriate system, such as, by way of example, the well known systems used in conjunction with microfilm. Similarly, while transparent substrates are generally preferred, reflective substrates may also be used whereby the image is created by the lack of reflection from the germanium upon the reflective background of the substrate. In this regard, it is to be noted that the opaqueness of the germanium is due, not primarily to its reflectivity, but due to rapid absorption of the light as it proceeds into the germanium. Thus, while the invention has been particularly shown and and described with reference to preferred embodiments thereof, it will be understood by those skilled in the art of various changes and in form and detail may be made therein without departing from the spirit and scope of the invention.

I claim:

1. A photomask blank comprising a transparent substrate with a film of germanium on one surface thereof, said germanium film having a thickness which is substantially opaque to ultraviolet light.

2. The photomask blank of claim 1 wherein said germanium film has a thickness in the range of 500 to 1,500 angstroms.

3. The photomask blank of claim 2 wherein said germanium film is a pyrolytically deposited film.

4. The photomask of claim 3 wherein said germanium film is patterned.

5. A photomask blank comprising a glass substrate with a pyrolytically deposited germanium film on one surface thereof, said film having a thickness in the range 500 to 1,500 angstroms.

6. The photomask of claim 5 wherein said germanium film is patterned.

* * * * *